United States Patent [19]

Sugano

[11] Patent Number: 4,501,174
[45] Date of Patent: Feb. 26, 1985

[54] HYDRAULIC CONTROL SYSTEM FOR AUTOMATIC TRANSMISSION

[75] Inventor: Kazuhiko Sugano, Yokohama, Japan

[73] Assignee: Nissan Motor Company, Limited, Yokohama, Japan

[21] Appl. No.: 348,837

[22] Filed: Feb. 16, 1982

[30] Foreign Application Priority Data

Feb. 17, 1981 [JP] Japan .................................. 56-20827

[51] Int. Cl.$^3$ .............................................. B60K 41/16
[52] U.S. Cl. ........................................ 74/869; 74/868; 74/752 C
[58] Field of Search .............. 74/869, 868, 867, 752 C

[56] References Cited

U.S. PATENT DOCUMENTS

| 2,740,303 | 4/1956 | Bock et al. | 74/864 |
| 2,845,817 | 8/1958 | Polomski | 74/645 |
| 3,053,116 | 9/1962 | Christenson et al. | |
| 3,083,589 | 4/1963 | Knowles et al. | |
| 3,274,848 | 9/1966 | Konrad et al. | 74/869 |
| 3,494,223 | 5/1966 | Mori | 74/688 |
| 3,563,115 | 2/1971 | Iijima et al. | 74/869 |
| 3,656,372 | 6/1972 | Chana | 74/869 |
| 3,667,323 | 4/1969 | Irie | |
| 3,713,354 | 1/1973 | Edmunds | 74/732 |
| 3,752,009 | 7/1970 | Chana | 74/645 |
| 3,831,465 | 8/1974 | Murakami | 74/869 |
| 3,861,241 | 1/1975 | Hancock | 74/733 |
| 3,895,542 | 7/1975 | Miyauchi | 74/869 |
| 3,978,743 | 9/1976 | Murakami | 74/869 |
| 4,006,652 | 2/1977 | Murakami | 74/869 |
| 4,307,631 | 10/1978 | Iwanaga et al. | 74/869 |
| 4,308,764 | 1/1982 | Kawamoto et al. | 74/869 |
| 4,346,627 | 8/1982 | Kawamoto et al. | 74/869 |
| 4,349,088 | 9/1982 | Ito et al. | 74/752 C |

FOREIGN PATENT DOCUMENTS

| 922507 | 2/1954 | Fed. Rep. of Germany . |
| 2164424 | 7/1972 | Fed. Rep. of Germany . |
| 1625124 | 11/1975 | Fed. Rep. of Germany . |
| 1140404 | 7/1957 | France . |
| 51153 | 4/1980 | Japan . |
| 1039890 | 8/1966 | United Kingdom . |
| 1181317 | 2/1970 | United Kingdom . |
| 1207076 | 9/1970 | United Kingdom . |
| 1408628 | 10/1975 | United Kingdom . |
| 1534628 | 12/1978 | United Kingdom . |
| 2017842 | 10/1979 | United Kingdom . |
| 2029525 | 3/1980 | United Kingdom . |
| 2028938 | 3/1980 | United Kingdom .................. 74/869 |

Primary Examiner—George H. Krizmanich
Assistant Examiner—Dirk Wright
Attorney, Agent, or Firm—Schwartz, Jeffery, Schwaab, Mack, Blumenthal & Koch

[57] ABSTRACT

A hydraulic control system for an automatic transmission comprises a first shift valve and a second shift valve which are coupled with a first port and a second port of a manual valve, respectively. The first shift valve receives a forward drive range pressure from the first outlet port of the manual valve when the manual valve is set in D or II or I range. The second shift valve receives a forward drive and reverse drive range pressure from the second outlet port of the manual valve when the manual valve is set in D or R or N range. The second shift valve is also coupled with a third outlet port of the manual valve to receive a manual range pressure when the manual valve is set in II or I range. The second shift valve is urged by the manual range pressure to shift to a downshift state wherein an outlet port thereof is allowed to communicate only with a drain port thereof.

5 Claims, 2 Drawing Figures

HYDRAULIC CONTROL SYSTEM FOR AUTOMATIC TRANSMISSION

BACKGROUND OF THE INVENTION

1. Field of the Invention

The present invention relates to a hydraulic control system, and more particularly to a hydraulic control system wherein a plurality of shift valves are coupled with a manual valve such that both of the shift valves are always supplied with a line pressure as long as the manual valve is set in an automatic forward drive range.

2. Description of the Prior Art

Automatic transmissions may be classified into two groups from the standpoint of arrangement of shift valves with respect to a manual valve. One group employs a so-called "series arrangement" wherein a 2-3 shift valve is coupled with an outlet port of a 1-2 shift valve which is coupled with a single outlet port of a manual valve such that the 2-3 shift valve is supplied with a line pressure only when the 1-2 shift valve is in its upshift state. The other group employs a so-called "parallel arrangement" wherein a 2-3 shift valve is coupled with an outlet port of a manual valve different from or the same as that outlet port of the manual valve with which a 1-2 shift valve is coupled.

A known control system for an automatic transmission disclosed in U.S. Pat. No. 3,667,323 issued to Namio IRIE on June 6, 1972 and assigned to Nissan Motor Company, Limited falls into the second group. According to this known control system, a 2-3 shift valve has an inlet port communicating with an outlet port of a manual valve via a conduit provided with a unitary structure including an orifice and an one-way check valve and, in operation, this conduit serves not only as a pressure supply passage but also as a drain passage. Upon making an upshift from a second gear ratio to a third gear ratio during operation when the manual valve is set is D range, the line pressure always supplied from the manual valve to the 2-3 shift valve is allowed to reach friction units necessary for establishing the third gear ratio. During this transitional, period the orifice of the unitary structure plays a role in controlling the rate of transmission of the oil to those friction units. Upon setting the manual valve to a manual second (II) range from D range when the vehicle is moving with the third gear ratio, an additional bias tending to urge the 2-3 shift valve toward a downshift state against a governor pressure indicative of the vehicle speed is created, and the conduit including the unitary structure is drained off, wherein, as long as the vehicle speed is high enough to hold the 2-3 shift valve in the upshift state, oil is discharged from the friction units through the conduit by opening the one-way check valve of the unitary structure. Therefore, the discharge of the oil from the friction elements is swiftly carried out without any flow restriction of the orifice of the unitary structure. The unitary structure including the orifice and the one-way check valve therefore is indispensable for shockless upshift operation to the third gear ratio and for swift transition from the third gear ratio to the second gear ratio to provide effective engine braking upon setting the manual valve to II range.

This known control system has problems in that troublesome work is necessary for inserting in the conduit the above-mentioned unitary structure including the orifice and one-way check valve, and in that the number of component parts is great, increasing difficulty in controlling the component parts and decreasing efficiency in the assembly work. Another problem is that oil tends to leak past that portion at which the unitary structure is connected to the oil conduit, resulting in a drop in reliability.

Another known control system which falls in the second group is disclosed in U.S. patent application Ser. No. 962,738 filed on Nov. 21, 1978, Kazuyoshi IWANAGA, et al., wherein a 2-3 shift valve is coupled with the same outlet port of a manual valve as that outlet port with which a 1-2 shift valve is coupled. In this known control system, since that conduit through which the pressure is supplied from the manual valve to the 2-3 shift valve is always supplied with the line pressure, this conduit does not serve as a drain conduit. Thus, a II range pressure which appears upon setting the manual valve to II range is exerted on the 2-3 shift valve to urge the same toward a downshift position against governor pressure and the oil is drained via a drain port of the 2-3 shift valve. As a countermeasure against the possibility that, should the 2-3 shift valve become stuck in the upshift state thereof, the transmission would be interlocked upon setting the manual valve to a manual first (I) range, an interlock valve must be provided which is responsive to the engagement of the friction unit to be engaged upon establishing the third gear ratio to prevent the supply of a manual first (I) range pressure to a friction unit to be engaged for establishing the first gear ratio in the I range.

Thus, a problem of this known control system is the need for an additional valve, i.e., the interlock valve.

SUMMARY OF THE INVENTION

According to the present invention, there is provided a hydraulic control system for an automatic transmission comprising pressure regulator valve means for producing a line pressure, manual valve means coupled with the pressure regulator valve means for producing at a first outlet port thereof a forward drive range pressure when the manual valve is set in an automatic forward drive range or at least one manual drive range, an automatic forward drive and reverse drive range pressure at a second outlet port thereof when the manual valve is set in the automatic forward drive range or a reverse drive range, and a manual range pressure at a third outlet port when the manual valve is set in the at least one manual range. First shift valve means is coupled with the first outlet port of the manual valve means and second shift valve means is coupled with said second outlet port of the manual valve means. The second shift valve means is coupled also with the third outlet port of the manual valve means and is operable to be urged by the manual range pressure to shift into a downshift state wherein an outlet port of the second shift valve means is allowed to communicate only with a drain port of the second shift valve means.

Accordingly, an object of the present invention is to provide a hydraulic control system for automatic transmission which is free from the above-mentioned problems encountered in the known hydraulic control systems and which prevents mechanical interlock in the automatic transmission without relying on the interlock valve.

BRIEF DESCRIPTION OF THE DRAWINGS

The invention will be further described hereinafter in connection with the accompanying drawings, wherein.

DESCRIPTION OF THE EMBODIMENT

Figure 1:
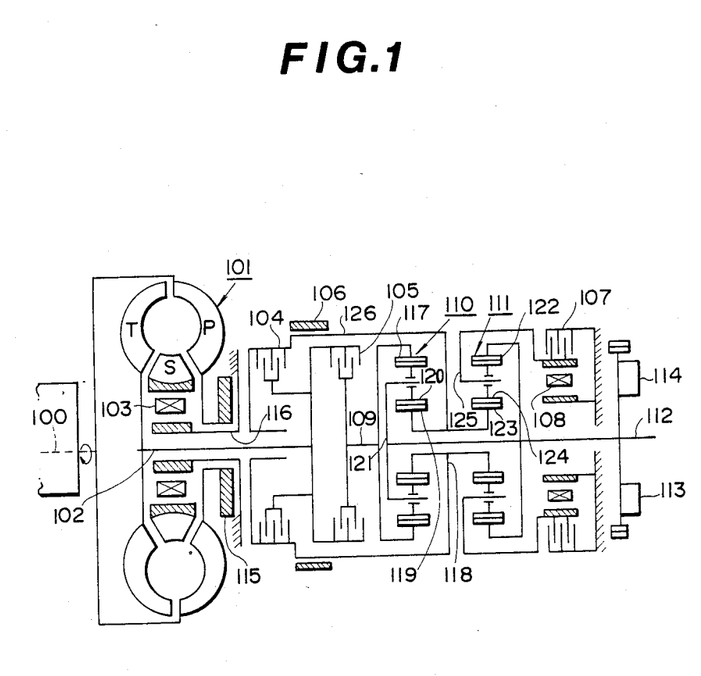
FIG. 1 is a schematic view of a change-speed gearbox used in an automatic transmission.

Referring to FIG. 1, a change-speed gearbox of an automatic transmission is illustrated which is controlled by a hydraulic control system according to the present invention. The change-speed gearbox provides three forward gear ratios and one reverse gear ratio and comprises a crank shaft 100 to be driven by an engine, a torque converter 101, an input shaft 102, a front clutch 104 (a high and reverse clutch), a rear clutch 105 (a forward clutch), a second brake 106 (an intermediate brake), a low-and-reverse brake 107, a one-way clutch 108, an intermediate shaft 109, a first planetary gear set 110, a second planetary gear set 111, an output shaft 112, a first governor valve 113, a second governor valve 114 and an oil pump 115.

The torque converter 101 comprises a pump impeller P, a turbine runner T and a stator S, of which the pump impeller P is driven by the crank shaft 100 so that the torque converter working oil contained therein is caused to swirl and imparts torque to the turbine runner T which is secured to the input shaft 102. The torque is further delivered through the input shaft 102 to the change-speed gearbox. The stator S is mounted about a sleeve 116 with an one-way clutch 103 interposed therebetween. The one-way clutch 103 is constructed and arranged in such a manner as to permit a rotation of the stator S in the same direction as the direction of rotation of the crank shaft 100, viz., the direction indicated by the arrow (abbreviated hereinafter as forward rotation) and to prevent the opposite rotation of the stator (abbreviated hereinafter as opposite rotation).

The first planetary gear set 110 comprises an internally toothed gear 117 rotatable with the intermediate shaft 109, a sun gear 119 rotatable with a hollow transmission shaft 118, two or more planet pinions 120, each meshing with the internally toothed gear 117 and the sun gear 119 so that it rotates and moves along an orbit, and a front planet carrier 121 rotatable with the output shaft 112 and having the planet pinions 120 thereon. The second planetary gear assembly 111 comprises an internally toothed gear 122 rotatable with the output shaft 112, a sun gear 123 rotatable with the hollow transmission shaft 118, two or more planet pinions 124, each meshing with the internally toothed gear 122 and the sun gear 123 so that it rotates and moves along an orbit, and a rear planet carrier 125 having the planet pinions 124.

Referring to the friction units, the front clutch 104 is operative to establish a connection between the transmission input shaft 102 to be driven by the turbine runner T and the hollow transmission shaft 118, rotatable in unison with the two sun gears 119 and 123 through a drum 126, while the rear clutch 105 is operative to connect the input shaft 102 and the internally toothed gear 117 of the first planetary gear assembly 110 through the intermediate shaft 109. The second brake 106 is operative to tighten a band winding the drum 126 secured to the hollow transmission shaft 118 so as to lock the two sun gears 119 and 123, while the low-and-reverse brake 107 is operative to lock the rear planet carrier 125 of the second planetary gear assembly 111. On the other hand, the one-way clutch 108 is so constructed and arranged as to permit the forward rotation of the rear planet carrier 125 but prevent the opposite rotation of the same. The first governor valve 113 and second governor valve 114 are fixed to the output shaft 112 and are operative to produce a governor pressure indicative of the vehicle speed.

Description will be hereinafter made of the power flow paths which are established during operation in an automatic forward drive range (D range).

Under this condition, the rear clutch 105 serving as the forward input clutch is engaged. The power from the engine, having passed through the torque converter 101, is transmitted, through the input shaft 102 and rear clutch 105, to the internally toothed gear 117 of the first planetary gear set 110. The rotation of the internally toothed gear 117 causes the planet pinions 120 for rotation in the forward direction. Since the sun gear 119 tends to rotate in the opposite direction to urge the sun gear 123 of the second planetary gear set 111, which is rotatable with the sun gear 119, to rotate in the opposite direction, the planet pinions 124 of the second planetary gear set 111 tend to rotate in the forward direction. The one-way clutch 108 is operative to prevent the rear planet carrier 125 from tending to rotate in the opposite direction, so that the sun gear 123 serves as a reaction brake in the forward direction. As a consequence, the internally toothed gear 122 of the second planetary gear set 111 rotates in the forward direction. It therefore follows that the output shaft 112 rotatable with the internally toothed gear 122 also rotates in the forward direction, thereby producing the first forward gear ratio. When, under this condition, the second brake 106 is applied after the vehicle speed has increased, the power which has passed through the input shaft 102 and the rear clutch 105 as in the first gear condition is transmitted to the internally toothed gear 117. The second brake 106 is operative to lock the drum 126 to prevent rotation of the sun gear 119, thus serving as a reaction brake in the forward direction. Accordingly, the planet pinions 120 rotate and move along an orbit around the sun gear 119 which is held stationary with the result that the front planet carrier 121 and the transmission output shaft 112 integral with the former rotate in the forward direction at a certain speed, although with a reduction ratio higher than the speed which would be achieved under the first gear ratio condition, thereby producing the second forward gear ratio. When the second brake 106 is released and the front clutch 104 is engaged after the vehicle speed has increased further, the power delivered to the input shaft 102 splits into a portion transmitted through the rear clutch 105 to the internally toothed gear 117 and into the remaining portion transmitted through the front clutch 104 to the sun gear 119. Therefore, the internally toothed gear 117 and the sun gear 119 are interlocked to rotate together with the front planet carrier 121 and the output shaft 112 at a common revolution speed in the forward direction, thereby producing the third forward gear ratio. Under this condition, the front clutch 104 and the rear clutch 105 may be referred to as an input clutch, and there is no reaction brake so that the planetary gear sets do not lend themselves to multiplication of torque.

The power flow path to be established for a reverse drive range (R range) will be hereinafter described.

When this range is selected, both of the front clutch 104 and low-and-reverse brake 107 are made operative. The power from the engine which has passed through the torque converter 101 is transmitted from the input shaft 102 through the front clutch 104 and the drum 126 to the sun gears 119 and 123. Since, under this condition, the rear planet carrier 125 is locked by the low-and-reverse brake 107, the rotation of the sun gears 119 and 123 in the forward direction causes the internally toothed gear 122 to rotate at a reduced speed in the reverse direction with the result that the output shaft 112 rotatable with the internally toothed gear 122 rotates in the reverse direction, thereby producing the reverse drive gear ratio.

Figure 2:
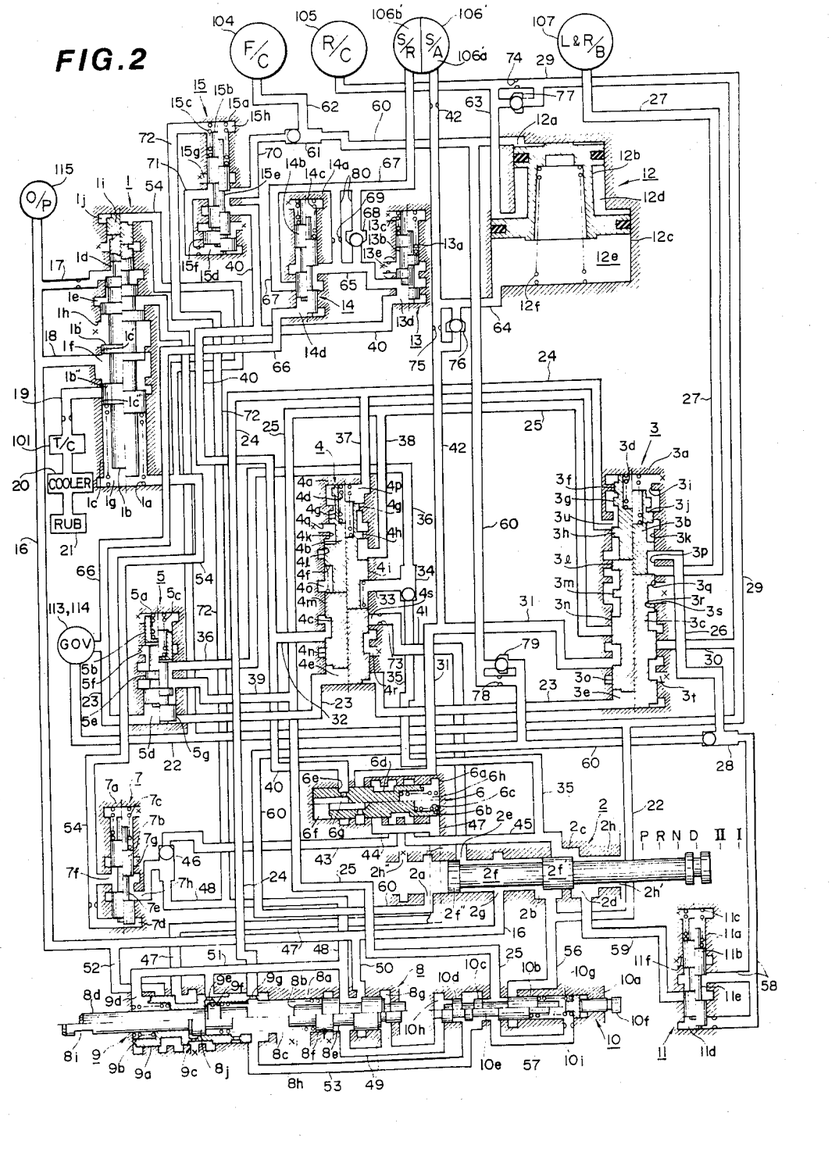
FIG. 2 is a circuit diagram showing a hydraulic control system for the automatic transmission according to the present invention.

The change-speed gearbox is controlled by the hydraulic control system shown in FIG. 2.

Referring to FIG. 2, the hydraulic control system comprises a regulator valve 1, a manual valve 2, a 1-2 shift valve 3, a 2-3 shift valve 4, a 3-2 downshift valve 5, a line pressure booster valve 6, a pressure modifier valve 7, a throttle valve 8, a throttle failsafe valve 9, a throttle modulator valve 10, a manual first range pressure reducing valve 11, an accumulator 12, a 2-3 timing valve 13, a 3-2 timing valve 14 and a front clutch pressure reducing valve 15, all these devices being connected as shown in the illustrated circuit network to the torque converter 101, the front clutch 104, the rear clutch 105, a band servo motor 106' for operating the second brake 106 (see FIG. 1), the low-and-reverse brake 107, the governor valves 113 and 114 and the oil pump 115.

The oil pump 115 is driven by the engine through the crank shaft 100 and the pump impeller P of the torque converter 101 and is operative to suck in oil from an oil reservoir. The oil is cleared of harmful dust by means of an oil strainer (not shown) and feeds the oil to a line pressure circuit 16 when the engine is in operation.

The regulator valve 1, which is adapted to regulate the pressure of the oil to a predetermined level, comprises a valve spool 1b, which is urged by means of a spring 1a to move toward a raised position indicated by the left half of the spool in the drawing. Valve spool 1b is slidably mounted within a housing 1c. Regulator valve 1 also comprises four chambers 1d, 1e, 1f and 1g. To each of the chambers 1d and 1f is fed oil under pressure from the line pressure circuit 16 by way of oil conduits 17 and 18. To the chamber 1e is fed a line pressure from an outlet port 2b (from which a forward drive range pressure is produced) of the manual valve 2 through an oil conduit 22 when the manual valve 2 is in any one of D range, II range and I range. Indicated at 1i is a plug, and a chamber 1j formed above the plug 1i and a chamber 1g formed below the valve spool 1b. These are in communication with an oil conduit 54. The valve spool 1b has a land 1b' having a diameter slightly smaller than the diameter of the corresponding rib 1c' of the housing 1c so as to form therebetween a small clearance which serves as a variable-area orifice. The oil in the chamber 1f is constantly discharged through this clearance and a drain port 1h at a rate which is determined by an amount of the overlap between the land 1b' and the rib 1c', so that a line pressure with a magnitude proportional to the amount of overlap is developed in the line pressure circuit 16. The valve spool 1b further has a land 1b'' which is slightly smaller in diameter than the bore 1c'' in the housing 1c so as to form a small clearance therebetween, so that the oil in the chamber 1f is supplied through this clearance and an oil conduit 19 to the torque converter 101, the oil cooler 20 and the various lubricating parts 21 in the transmission.

The line pressure developed in the line pressure circuit 16 is directed to the manual valve 2, which serves as a range selector valve. The manual valve 2 comprises a valve spool 2f which is slidably mounted within a housing 2h and manually operable by a selector lever mounted near a driver's seat. The valve spool 2f is movable between a neutral (N) range, an automatic forward drive (D) range, a manual second (II) range, a manual first (I) range, a reverse drive (R) range and a parking (P) range and is arranged to cause the line pressure circuit 16 to communicate with the ports indicated by the sign "o" in the following table when the above mentioned selector lever is operated to urge the valve spool 2f to move to one of these range positions. The outlet ports which are not in communication with the line pressure circuit 16 are all made open to the drain openings 2h' and 2h'' on both ends of the housing 2h and thus serve as drain ports.

| Range | Ports | | | | |
| --- | --- | --- | --- | --- | --- |
| | 2a | 2b | 2c | 2d | 2e |
| P | | | | | |
| R | o | | | | o |
| N | | | | | o |
| D | | o | | | o |
| II | | o | o | | |
| I | | o | o | o | |

The first governor valve 113 and the second governor valve 114 are operative to develop a governor pressure indicative of vehicle speed under forward drive range condition including automatic forward drive (D) range, manual second (II) range and manual first (I) range. When the manual valve 2 is set in D range or II range or I range, the line pressure is first fed to the second governor valve 114 through the outlet port 2b which is allowed to communicate with the line pressure circuit 16, as will be understood from the above table, and through an oil conduit 22. When vehicle is moving forwardly, the line pressure in the second governor valve 114 is regulated thereby into governor pressure indicative of the vehicle speed, the governor pressure being extended to the first governor valve 113. When the vehicle speed increases beyond a predetermined value, the first governor valve 113 allows the governor pressure into a governor pressure circuit 23. The governor pressure is thereafter distributed through the circuit 23 to the 1-2 shift valve 3, 2-3 shift valve 4 and 3-2 downshift valve 5.

In the following several paragraphs, a so-called "parallel arrangement" of the 1-2 shift valve 3 and 2-3 shift valve 4 with respect to the manual valve 2 is described.

As shown in FIG. 2, the 1-2 shift valve 3 is coupled with outlet port 2b of the manual valve 2 via an oil conduit 30 branching from an oil conduit 29 that branches from the oil conduit 22 extending from the outlet port 2b to the governor valves 113 and 114. The 2-3 shift valve, on the other hand, is coupled with outlet port 2e of the manual valve 2 via a conduit 41 provided with an orifice 73 for controlling the rate of flow of fluid passing through the oil conduit 41. The 2-3 shift valve 4 is coupled also with outlet port 2c of the manual valve 2 via an oil conduit 33 and an oil conduit 35 branching from the oil conduit 45 extending from the outlet port 2c to the line pressure booster valve 6.

The 1-2 shift valve 3 comprises a housing 3a and two valve spools 3b and 3c which are arranged axially in line with each other and which are slidably mounted within the housing 3a. That end face of the valve spool 3b which is most remote from the valve spool 3c is acted upon by a spring 3d and that end face of the valve spool 3c which is most remote from the valve spool 3b is located in a chamber 3e. The valve spool 3b is formed with lands 3f, 3g and 3h which are larger in diameter in this sequence, while the housing 3a is formed with ribs 3i, 3j and 3k which are associated with these lands, respectively. The valve spool 3c is further formed with lands 3e and 3m and with lands 3n and 3o the latter two being larger in diameter than the former two. The housing 3a is formed with two ribs 3p and 3q associated with the lands 3e and a rib 3r associated with the land 3m. The 1-2 shift valve 3 is in communication with the governor pressure circuit 23, a kickdown pressure circuit 24 and a gear shift control pressure circuit 25 as shown in the drawing and further with an oil conduit 27 which is to communicate with an oil conduit 26 or a drain port 3s depending upon the axial position of the land 31. The governor pressure circuit 23 communicates with the groove between the lands 3g and 3h when the valve spool 3b is in the position indicated by the right half thereof and with the groove between the lands 3g and 3h and the groove between the lands 3f and 3g when the valve spool 3b is in the position indicated by the left half thereof. On the other hand, the gear shift control pressure circuit 25 is to be in communication with the groove between the lands 3m and 3n when the valve spool 3c is in the position indicated by the right half of the spool and to be closed by the land 3n when the valve spool 3c is in the position indicated by the left of the spool. The oil conduit 26 is in communication with an output port of a shuttle valve 28, and the oil conduit 27 is in communication with the low-and-reverse brake 107. The 1-2 shift valve 3 is further in communication with the oil conduit 30 extending from the oil conduit 29 branching to the rear clutch 105 from the oil conduit 22 extending from the port 2b of the manual valve 2 to the governor valves 113 and 114, and is also in communication with an oil conduit 31 which are allowed to communicate with the oil conduit 30 or is prevented from communicating with it depending upon the axial position of the land 3n and which conduit 31 leads to a line pressure booster valve 6. The oil conduit 31 communicates with a drain port 3t when the spool 3c is in the position indicated by the right half of the spool. In the oil conduit 29 are provided an orifice 74 and a check valve 77 which are arranged in parallel.

The 2-3 shift valve 4 comprises a housing 4a having two valve spools 4b and 4c axially arranged in line with each other and slidably mounted within the housing 4a. That end face of the valve spool 4b which is most remote from the valve spool 4c is acted upon by a spring 4d, while that end face of the valve spool 4c which is most remote from the valve spool 4b is located in a chamber 4e with the spring 4f provided between the valve spools 4b and 4c. The valve spool 4b is formed with lands 4g, 4h and 4i which are larger in diameter in this sequence, while the housing 4a is formed with ribs 4j, 4k and 4l which are respectively associated with these lands. On the other hand, the valve spool 4c is formed with two lands 4m and 4n. Connected with the 2-3 shift valve 4 is an oil conduit 32 which is permitted to communicate with or isolated from the oil conduit 41 provided with an orifice 73 depending upon the axial position of the land 4m. When the valve spool 4c is in the position indicated by the right half thereof, the oil conduit 32 is in communication with a drain port 4r, and the oil conduit 41 is blocked by the land 4m. The orifice 73 is disposed adjacent an inlet port 4s at which the oil conduit 41 is connected to the 2-3 shift valve 4. The chamber 4o formed between the valve spools 4b and 4c is in communication with the output port of a shuttle valve 34 through an oil conduit 33. The shuttle valve has one inlet port communicating with the output port 2c of the manual valve 2 through oil conduit 35 and the other inlet port communicating with an oil conduit 36. The chamber 4e is in communication with the governor pressure circuit 23 and a chamber 4p receiving the spring 4d is in communication with the kickdown pressure circuit 24 through an oil conduit 37. The kickdown pressure circuit 24 is such that a kickdown pressure is applied to the upper pressure acting face of the land 4g when the valve spool 4b is in the position indicated by the right half thereof and to the upper and lower pressure acting faces of the land 4g when the valve spool 4b is in the position indicated by the left half thereof. The 2-3 shift valve 4 is further in communication with the gear shift control pressure circuit 25 through an oil conduit 38 so that a gear shift control pressure is developed between the land 4h and the land 4i when the valve spool 4b is in the position indicated by the right half thereof. There is further provided a drain port 4q which is to be open to the groove between the land 4h and the land 4i when the valve spool 4b is in the position indicated by the left half thereof.

The 2-3 downshift valve 5 comprises a housing 5a having a valve spool 5b slidably mounted therein. The valve spool 5b has one end face acted upon by a spring 5c and the other end face located in a chamber 5d. The 3-2 downshift valve 5 is in communication with the oil conduit 36 in such a manner as to communicate with either an oil conduit 39 extending from the gear shift control pressure circuit 25 or a drain port 5f depending upon the axial position of a land 5e, a chamber 5d being in communication wih the governor pressure circuit 23.

The line pressure booster valve 6 comprises a housing 6a having a valve spool 6b slidably mounted therein, the valve spool 6b being urged to move leftwardly in the drawing by means of a spring 6c. The valve spool 6b is formed with grooves 6d and 6e and an oil conduit 6g for providing communication between the groove 6e and a chamber 6f. The line pressure booster valve 6 is in communication with an oil conduit 40 to be open to the groove 6e when the valve spool 6b is moved to the left and an oil conduit 31 to be open to the groove 6e when the valve spool 6b moves to the right. The oil conduit 40 is joined to the oil conduit 32 and is thus in communication with the 2-3 timing valve 13 and the front clutch pressure reducing valve 15, while the oil conduit 31 is in communication via an oil conduit 42 with a servo apply chamber 106′a of the servo motor 106′. The line pressure booster valve 6 is further in communication with an oil conduit 43 which is always open to the groove 6d and with oil conduits 44 and 45 which are to be selectively brought into communication with the oil conduit 43 through the groove 6d and with oil conduits 44 and 45 which are to be selectively brought into communication with the oil conduit 43 through the groove 6d depending upon the axial position of the valve spool 6d. The oil conduit 43 is in communication with one inlet port of a shuttle valve 46 and the oil conduit 44 is in communication with the throttle failsafe valve 9 through an oil conduit 47 extending from a chamber 6h receiving the spring 6c, while the oil conduit 45 is in communication with the outlet port 2c of the manual valve 2.

The transmission throttle valve 8 comprises a housing 8a having a valve spool 8b slidably mounted therein and a plunger 8d provided in line with the valve spool 8b across a spring 8c. The plunger 8d is connected to the accelerator pedal by means of, for example, a mechanical linkage and is adapted to move rightwardly in the drawing from an idling position indicated by the lower half of the plunger thereby to add to the force of the spring 8c as the accelerator pedal is depressed. The valve spool 8b is formed with a groove 8e. A throttle pressure circuit 48 and an oil conduit 49 are provided in communication with the throttle valve 8 in such a manner as to be always open to the groove 8e. The throttle valve 8 is further provided with a drain port 8f which can communicate with the throttle pressure circuit 48 through the groove 8e depending upon the axial position of the valve spool 8b, and communicates with an oil conduit 50 leading from the line pressure circuit 16, the oil conduit 49 being in communication with a chamber 8g. Increasing the force of the spring 8 by moving the plunger 8d rightwardly as the accelerator pedal is depressed causes a throttle pressure to be created within the chamber 8g and fed to the throttle pressure circuit 48, the throttle pressure being determined so as to balance with the spring force of this spring by relieving the line pressure fed to this chamber from the oil conduit 50 by drainage through the drain port 8f. Thus, the throttle valve 8 delivers, by modifying the line pressure, a throttle pressure which corresponds to the force of the spring 8c (viz., the distance of stroke of the accelerator pedal depressed) and which is proportional to the throttle opening degree. When the accelerator pedal is depressed to a kickdown position, the plunger 8d compresses the spring 8c to a full extent and is brought into abutting engagement with the valve spool 8b and forces the valve spool 8b to move to a limit position closing the drain port 8f thereby to provide communication between the throttle pressure circuit 48 and the oil conduit 50. Under this condition, the throttle pressure is equal in magnitude to the line pressure.

The throttle pressure circuit 48 is in communication with the other inlet port of the shuttle valve 46 and further leads to the throttle failsafe valve 9 through an oil conduit 51. The throttle failsafe valve 9 comprises a sleeve 9a which is slidably mounted within a housing 8a in such a manner as to be capable of guiding the plunger 8d, the leftward movement of the sleeve being elastically limited by means of a spring 9b. The oil conduit 47 providing communication between the line pressure booster valve 6 and the throttle failsafe valve 9 is normally open to the drain port 9c of the throttle failsafe valve 9. The oil conduit 51 is in communication with a chamber 9d receiving the spring 9b on one hand and on the other hand oil conduit 51 communicates through a port 9e with a chamber 9f to which an enlarged portion 8j of the plunger 8d is exposed. The kickdown pressure circuit 24 communicates with a port 9g. An oil conduit 52 leads from the line pressure circuit 16 to the throttle failsafe valve 9 wherein this oil conduit is normally closed, but under an abnormal condition when the sleeve 9a takes the lower half position in the drawing, the oil conduit 52 communicates with the oil conduit 47, the operation of this valve under this condition being described in detail later. During the movement of the plunger 8d in such a direction as being depressed, the throttle pressure developed in the throttle pressure circuit 48 is directed through the oil conduit 51 and the port 9e to the chamber 9f and acts on the enlarged portion 8j of the plunger 8d and exerts to the plunger 8d a force effective to move the plunger inwardly against the force of the spring 8c. Thus, the accelerator pedal is prevented from being excessively loaded by the spring 8c when the pedal is depressed. When, furthermore, the plunger 8d is urged to move to a kickdown position, the kickdown pressure circuit 24 which has been in communication with the drain port 8h through the port 9g is now isolated from the drain port 8h and is permitted to communicate with the oil conduit 51 through the port 9e, chamber 9f and port 9g. Under this condition, the valve spool 8b moves rightwardly in the drawing as previously described and, as a consequence, the line pressure in the oil conduit 50 is passed to the throttle pressure circuit 48 without being drained off, thereby developing in the circuit 24 a kickdown pressure which is equal, in magnitude, to the line pressure. The kickdown pressure thus delivered is supplied also to the throttle modulator valve 10 by way of an oil conduit 53. If damage should take place in the mechanical linkage interconnecting the accelerator pedal and the plunger 8d and the plunger 8d should disengage from the accelerator pedal, the plunger 8d would be urged to move by a return spring, not shown, to the idling position which is indicated by the lower half of the plunger, so the plunger 8d would force the sleeve 9a to move leftwardly into the position indicated by the lower half thereof. There being no force imparted to the valve spool 8b by the spring 8c under this condition, the valve spool 8b assumes a position allowing the drain port 8f to be slightly open and substantially fully closing the oil conduit 50. Furthermore, the oil conduit 51 is on one hand in communication with the drain port 9c through the port 9e and the chamber 9f for maintaining the throttle pressure at zero level and on the other hand permits the oil conduit 47 to communicate with the oil conduit 52 for directing the line pressure to the oil conduit 47. The line pressure thus developed in the oil conduit 47 is passed through the line pressure booster valve 6, the oil conduit 43 and the shuttle valve 46 to the pressure modifier valve 7 and is modified into a pressure which is equal to the force of the spring 7c in a state wherein the valve spool 7b is held in the position indicated by the left half thereof. The modified throttle pressure has its maximum value being further directed to the chambers 1g and 1j of the pressure regulator valve 1 through oil conduit 54 for thereby boosting the line pressure to its maximum value. As a consequence, the friction units are actuated by the line pressure having the maximum magnitude and thus enables the vehicle to run to a repair shop without any assistance thereto and without causing damage due to a slip in the friction units, which would cause the friction units to become burnt.

The pressure modifier valve 7 comprises a housing 7a having a valve spool 7b slidably mounted within the housing and having one end face acted upon by a spring 7c and the other end face located in a chamber 7d. The valve spool 7b is formed with a groove 7e, while the housing 7a is formed with an outlet port 7f always open to the groove, a drain port 7g and an inlet port 7h. The ports 7g and 7h are arranged in such a manner that one of the ports is about to be opened when the other of the ports is about to be closed during movement of the valve spool 7b. The port 7f is in communication on the one hand with the chamber 7d and on the other hand with the chamber 1g and the chamber 1j into which projects the plug 1i disposed in series with the valve spool 1b in the pressure regulator valve 1, while the port 7h is in communication with the outlet port of the shuttle valve 46.

With the pressure modifier valve 7 thus constructed, the spring 7c holds the valve spool 7b in a position which is lower than the position indicated by the left half in the drawing when the oil pressure developed in the port 7h is less than a set force of the spring 7c (the set force of the spring 7c being a force as achieved when the valve spool 7b is held in the position indicated by the left half thereof), thereby closing the drain port 7g and providing communication between the port 7f and the port 7h so that the oil pressure developed in the port 7h is directed to the port 7f and further through the oil conduit 54 to the regulator valve 1. Under this condition, the oil pressure is directed also to the chamber 7d and causes the valve spool 7b to move from the position indicated by the right half thereof to the position indicated by the left half thereof against the force of the spring 7c as the oil pressure increases. If, however, the oil pressure to be delivered from the port 7f tends to further increase, the valve spool 7b is urged to move upwardly beyond the position indicated by the left half of the spool and permits the port 7f to communicate with the drain port 7g with the result that the oil pressure to be delivered to the oil conduit 54 can not be augmented beyond a certain value which is dictated by the force of the spring 7c under a condition in which the valve spool 7b is held in the position indicated by the left half thereof, so that when the throttle pressure in the throttle pressure circuit 48 is supplied via the shuttle valve 46 to the port 7h, the pressure modifier valve 7 produces an oil pressure called modified throttle pressure which varies such that it increases with an increase in the throttle opening degree up to two fourths (2/4) of the full opening degree but stops increasing thereafter.

The throttle modulator valve 10 comprises a housing 10a having slidably mounted therein a valve spool 10e which is formed with three lands 10b, 10c and 10d and which has one end face acted upon by a spring 10g having a spring force adjustable by means of an adjuster 10f and the other end face located in a chamber 10h. The circuit 25 is arranged in the housing 10a in such a manner as to be at all times open to the groove between the lands 10b and 10c, while an oil conduit 53 and an oil conduit 56 extending from the port 2b of the manual valve 2 are arranged in the housing 10a in such a manner that one of these oil conduits is about to be opened when the other thereof is about to be completely closed during movement of the valve spool 10e. The housing 10a is further connected with an oil conduit 57 aligned with the oil conduit 25, the oil conduit 57 being in communication with a chamber 10i having a spring 10g accommodated therein. Furthermore, a chamber 10h is provided which is in comminication with the throttle valve 8 through an oil conduit 49.

With the throttle modulator valve 10 thus constructed, the valve spool 10e is held in the position indicated by the lower half thereof by the force of the spring 10g when the throttle pressure directed through the oil conduit 49 into the chamber 10h is zero. Under this condition, the oil conduit 56 extending from the manual valve 2 is isolated from the circuit 25 and the oil conduit 57 by means of the valve spool 10b and the gear shift control pressure circuit 25 and the oil conduit 57 are held in communication with the drain port 8h through the oil conduit 53 and the port 9g of the throttle failsafe valve 9 so that there is no oil pressure developed in the circuit 25 and the oil conduit 57. As the throttle pressure rises, the valve spool 10e is urged to move beyond the position indicated by the upper half thereof against the force of the spring 10g to permit the line pressure which is directed from the port 2b of the manual valve 2 to the oil conduit 56. The line pressure is further applied through the oil conduit 57 to the chamber 10i, and cooperates with the force of the spring 10g, to move the valve spool 10e back toward the balanced position indicated by the upper half thereof. The throttle modulator valve 10 is thus capable of regulating the line pressure from the oil conduit 56 by the throttle pressure directed into the chamber 10h, thereby delivering a modulated throttle pressure to the gear shift control circuit 25 which appears in response to a throttle opening degree larger than, for instance, two fourths (2/4) of the full opening degree and which thereafter varies substantially in direct proportion to the throttle valve opening degree. Under kickdown condition in which the plunger 8d of the throttle valve 8 moves inwardly, the port 9g is isolated from the drain port 8h as previously discussed and, as a consequence, the throttle pressure having the same magnitude as the line pressure is fed from the port 9g to the throttle modulator valve 10 by way of the oil conduit 53 so that oil pressure with the same magnitude as the line pressure is developed in the gear shift control pressure circuit 25 and the oil conduit 57 and is directed to the chamber 10i for urging the valve spool 10e to move to the leftward limit position thereof with the result, under kickdown condition, oil pressure equal in magnitude to the line pressure is always developed in the circuit 25.

The manual first range pressure reducing valve 11 comprises a housing 11a having slidably mounted therein a valve spool 11b which has one end face acted upon by a spring 11c and the other end face located in a chamber 11d. The valve spool 11b is formed with a groove 11e and the housing 11a is formed with an oil conduit 58 which is constantly open to the groove, the oil conduit 58 being in communication with one inlet port of the shuttle valve 28 and with the chamber 11d. The housing 11a is further formed with a drain port 11f and is in communication with an oil conduit 59 extending from the outlet port 2d of the manual valve 2, the drain port 11f and oil conduit 59 being arranged in such a manner that one of them is about to be opened when the other is about to be completely closed during movement of the valve spool 11b.

Thus, the manual first range pressure reducing valve 11 is operative to partially discharge the line pressure directed from the manual valve 2 to the oil conduit 59 and reduces the line pressure to a constant oil pressure level determined by the force of the spring 11c in a condition indicated by the left half thereof when the I range is selected. The pressure thus obtained being delivered to the oil conduit 58 so that the low-and-reverse brake 107 which is to be also operative under reverse drive condition is precluded from producing an excessively large torque transmission capacity.

The port 2a of the manual valve 2 is in communication with the other inlet port of the shuttle valve 28 through an oil conduit 60 and further with one inlet port of a shuttle valve 61, the outlet port of the shuttle valve 61 being in communication with the front clutch 104 through an oil conduit 62. The oil conduit 60 which leads to the front clutch 104 has provided therein a parallel combination of an orifice 78 and a check valve 79 and is branched downstream of these elements for communication with a chamber 12a of the accumulator 12. The accumulator 12 comprises a stepped piston 12b and a stepped cylinder 12c having the piston slidably fitted therein for defining two chambers 12d and 12e in addition to the above mentioned chamber 12a in the cylinder, the piston 12b being urged to move upwardly in the drawing by means of a spring 12f. The chamber 12d is in communication with the oil conduit 29 through an oil conduit 63, while the chamber 12e is in communication with the oil conduit 42 through an oil conduit 64. The oil conduit 42 is arranged with a parallel combination of an orifice 75 and a check valve 76 which are located upstream of the accumulator 12.

The 2-3 timing valve 13 comprises a housing 13a having slidably mounted therein a valve spool 13b which has one end face acted upon by a spring 13c and the other end face located in a chamber 13d, the chamber 13d being in communication with the oil conduit 40. The valve spool 13b is urged by means of the spring 13c to move toward a lower position allowing an oil conduit 65 to be open to a drain port 13e, as indicated by the right half of the spool, and is movable into an upper position allowing the oil conduit 65 communicate with the oil conduit 40 through the chamber 13d, as indicated by the left half of the spool in the drawing.

The 3-2 timing valve 14 comprises a housing 14a having slidably mounted therein a valve spool 14b which has one end face acted upon by a spring 13c and the other end face located in a chamber 14d. The valve spool 14b is responsive to the governor pressure directed from the governor pressure circuit 23 to the chamber 14d by way of an oil circuit 66 and is movable into a lower position allowing the oil conduit 65 to be open to an oil conduit 67 leading to the servo release chamber 106'b of the band servo 106', as indicated by the right half of the valve spool 14b, and an upper position isolating the oil conduit 65 from the oil conduit 67, as indicated by the left half of the spool. Between the oil conduits 65 and 67 is provided a parallel combination 80 of a check valve 68 and an orifice 69 which bypasses the 3-2 timing valve 14.

The front clutch pressure reducing valve 15 comprises a housing 15a having slidably mounted therein a valve spool 15b which has one end face acted upon by a spring 15c and the other end face located in a chamber 15d. The valve spool 15b is formed with a groove 15e forming lands on both sides thereof and further with a land 15f which is larger in diameter than these lands. On the other hand, the housing 15a is formed with an oil conduit 70 which is always open to the groove 15e and which is in communication with the other input port of the shuttle valve 61. The housing 15a is further formed with a drain port 15g and is in communication with the oil conduit 40, the drain port and the oil conduit being arranged so that one of them is permitted to open when the other of them is completely closed during movement of the valve spool 15b. The housing 15a is still further formed with an oil conduit 71 which is open in radial alignment with the oil conduit 70 and which is in communication with the chamber 15d. A chamber 15h having the spring 15c mounted therein is in communication with the throttle pressure circuit 48 through an oil conduit 72.

With the front clutch pressure reducing valve 15 thus arranged, the valve spool 15b is urged by the spring 15c to move toward a lower position isolating the oil conduit 70 from the drain port 15g and connected to the oil conduit 40 as indicated by the right half of the valve spool. When, therefore, the line pressure is directed to the oil conduit 41 through the oil conduit 41 under the control of the 2-3 shift valve 4 as will be described later, the line pressure is directed through the oil conduit 70 and the shuttle valve 61 to the front clutch 104. Since, however, the line pressure thus conducted is restricted in the orifice 73 at the inlet port 4s of the 2-3 shift valve 4 which is connected to the oil conduit 41, it increases initially at a limited rate and thereafter at a gradually increasing rate. Such a pressure is also fed through the oil conduit 71 to the chamber 15d and causes the valve spool 15b to move upwardly in the drawing. On the other hand, there is developed in the chamber 15h a throttle pressure which is directed from the throttle pressure circuit 48 by way of the oil conduit 72 and which is proportional to the throttle valve opening degree. In cooperation with the force of the spring 15c, the throttle pressure causes the valve spool 15d to move downwardly in the drawing until the valve spool 15b rests in a position in which the downward force thus exerted thereon is equal to the force urging the spool upwardly. When the pressure being supplied to the front clutch 104 reaches a predetermined value after the pressure has appeared, the valve spool 15b moves upwardly into the position having the oil conduit 70 isolated from the oil conduit 40 and comes into communication with the drain port 15g as indicated by the left half of the spool and is balanced in that particular position. For this reason, the oil pressure supplied to the front clutch cannot be increased beyond the above mentioned predetermined value. Because, however, of the fact that the throttle pressure is directed into the chamber 15h and lends itself to the control of the pressure to be supplied to the front clutch, the pressure supplied to the front clutch increases as the throttle valve opening degree increases. Under kickdown condition, on the other hand, the throttle pressure rises to the level of the line pressure as previously noted with the result that the oil pressure supplied to the front clutch also varies with the throttle valve opening degree.

The operation of the hydraulic control system as has been hereinbefore described will now be explained.

The pressure regulator valve 1 is supplied with the pump pressure directed to the chamber 1d from the oil pump 115, the modified throttle pressure directed to the chamber 1f from the pressure modifier valve 7, and thus the valve spool 1b is urged to move downwardly in the drawing. Into the chamber 1g is directed the modified throttle pressure which, in cooperation with the force of the spring 1a, urges the valve spool 1b to move upwardly in the drawing. The valve spool 1b is held in a position in which the forces thus exerted thereon are balanced, thereby developing in the circuit 16 a line pressure which is determined by such a position of the valve spool. The line pressure thus developed is directed through the circuit 16 to the inlet port 2g of the manual valve 2. When the manual valve 2 is set in P range or R range or N range, the chamber 1e of the pressure regulator valve 1 is drained off through the port 2b of the manual valve 2 with the result that the line pressure in the circuit 16 becomes higher than that achieved in D range or II range or I range because of the fact that there is no force effective to urge the valve spool 1b to move downwardly in the absence of the line pressure in the chamber 1e of the pressure regulator valve 1.

When the driver urges the spool 2f of the manual valve 2 to move from N range position to D range position, the line pressure circuit 16 is permitted to communicate with the outlet ports 2b and 2e. The line pressure in the outlet port 2b is directed on one hand through the oil conduit 56 to the throttle modulator valve 10 and on the other hand through the oil conduits 22 and 29 to the rear clutch 105. The line pressure in the port 2e is directed through the oil conduit 41 to the inlet port 4s of the 2-3 shift valve 4, but, it is prevented from extending further beyond the 2-3 shift valve 4 because the spool 4c is in the downshift position as illustrated by the right half in the drawing and closes the inlet port 4s. The line pressure directed through the oil conduit 56 to the throttle modulator valve 10 is modulated into the previously mentioned modulated throttle pressure and is delivered to the oil conduit 25. The line pressure being passed through the oil conduit 29 is restricted by the orifice 74 on its way to the rear clutch 105 and is fed to the rear clutch 105 initially at a limited rate and thereafter at a gradually increasing rate. The pressure thus fed to the rear clutch is also directed through the oil conduit 63 to the chamber 12d of the accumulator 12 and causes the stepped piston 12b to move downwardly toward the large-diameter side against the force of the spring 12f. By virture of this, the oil pressure supplied to the rear clutch 105 is augmented slowly so that the rear clutch 105 is enabled to couple softly without producing shocks encountered with the selection of D range from N range. The rear clutch being thus coupled, the automatic transmission enables the vehicle to move off from rest with the first gear ratio. The line pressure passing through the oil conduit 29 is directed through the oil conduit 30 to the 1-2 shift valve 3, but, it is prevented from extending further beyond the 1-2 shift valve 3 because the spool 3c is in the downshift position, as illustrated by the right half of the drawing, and closes the oil conduit 30.

The line pressure from the port 2b of the manual valve 2 is directed through the oil conduit 22 also to the governor valves 113 and 114, which deliver to the circuit 23 governor pressure indicative of vehicle speed. The port 2b of the manual valve 2 being always open to the line pressure circuit 16 and thus allowing the line pressure to extend to the oil conduit 22 throughout the forward drive ranges including D range, II range and I range, the governor pressure is delivered into the governor pressure circuit 23 when the manual valve 2 is in the forward drive ranges.

When the vehicle speed reaches a certain value, the governor pressure varying with the vehicle speed and directed to the chamber 3e of the 1-2 shift valve 3 overcomes the downward force with which the spring 3d urges the valve spools 3b and 3c toward the positions indicated by the right halves of the spools illustrated in the drawing and the downward force with which the modulated throttle pressure directed from the circuit 25 acts on the differential pressure acting area between the lands 3m and 3n, causing the valve spools 3b and 3c to move upwardly from the downshift state indicated by the right halves thereof. When the land 3m moves beyond the rib 3r during such movement of the valve spools, the chamber formed between the lands 3m and 3n is brought into communication with the drain port 3s, and at the same time the modulated throttle pressure directed from the oil conduit 25 acts on the differential pressure acting area between the lands 3m and 3n, eliminating the downward force which has been exerted on the valve spool 3c and thereby causing the valve spools 3b and 3c to move instantaneously into the positions indicated by the left halves of the spools. As a consequence, the oil conduit 30 branching from the oil conduit 29 is permitted to communicate with the oil conduit 31 so that the line pressure which has been directed to the oil conduit 29 is passed through the oil conduit 30 and the 1-2 shift valve 3 to the oil conduit 31. The line pressure is thereafter fed to the servo apply chamber 106'a of the band servo motor 106' by way of the oil conduit 42 and is restricted by the orifice 75 on its way toward the servo apply chamber 106'a with the result that the servo apply pressure increases initially at a restricted rate and thereafter at a gradually increasing rate. The servo apply pressure is directed by way of the oil conduit 64 to the chamber 12e of the accumulator 12 so that the stepped piston 12b which has moved into the lowered position thereof as previously described is urged to move back by the servo apply pressure which acts on the piston in cooperation with the force of the spring 12f. This causes the servo apply pressure to rise slowly and enables the band servo motor 106' to apply the second brake 106 (see FIG. 1) slowly. The second brake 106 being thus applied, a shift is made from the first gear ratio to the second gear ratio in the automatic transmission having the rear clutch 105 maintained in the coupled state. The gear shift shock to be produced during shifting operation is alleviated by the above described operation of the accumulator 12.

As the vehicle speed further increases under condition in which the vehicle is moving with the second gear ratio, the governor pressure indicative of the vehicle speed and directed through the governor pressure circuit 23 to the chamber 4e of the 2-3 shift valve 4 overcomes the downward force with which the spring 4d urges the valve spools 4b and 4c and the downward force with which the modulated throttle pressure directed from the conduits 25 and 38 acts on the differential area between the land 4h and land 4i, thereby causing the valve spools 4b and 4c to move upwardly from the downshift state indicated by the right halves of the spools. When the land 4h moves beyond the rib 4k during such movement of the valve spools, the chamber formed between the lands 4h and 4i is permitted to communicate with the drain port 4q for eliminating the downward force which has been caused by the modulated throttle pressure, thereby causing the valve spools 4b and 4c to instantaneously move upwardly into the upshift state indicated by the left halves of the spools. As a consequence, communication is provided between the oil conduit 41 and oil conduit 32, with the result that the line pressure which has been directed to the port 4s through the oil conduit 41 as previously described is passed through the 2-3 shift valve 4 and the oil conduit 32 to the oil conduit 40. The line pressure thus passed to the oil conduit 40 is extended through the passages 6e and 6g of the line pressure booster valve 6 to the chamber 6f of the valve for causing the valve spool 6b to move rightwardly in the drawing from the position indicated by the upper half to the position indicated by the lower half of the valve spool and is further directed to the chamber 13d of the 2-3 timing valve 13 and the corresponding port of the front clutch pressure reducing valve 15. Since, in this instance, the line pressure to be directed to the oil conduit 40 is restricted by the orifice 73 provided in the inlet port 4s of the 2-3 shift valve 4, the pressure passed to the former conduit rises initially at a restricted rate and thereafter at a gradually increasing rate. It therefore follows that the oil pressure directed from the oil conduit 40 to the chamber 13d is initially unable to move the valve spool 13b against the force of the spring 13c and permits the valve spool 13b to stay in the position indicated by the right half thereof. Likewise, the pressure which has been directed from the oil conduit 40 to the chamber 15d of the front clutch pressure reducing valve 15 by way of the oil conduit 71 is initially unable to overcome the downward force exerted on the valve spool 15b by the spring 15c and the downward force exerted on the valve spool by the throttle pressure directed from the throttle pressure circuit 48 to the oil conduit 72 and is not capable of urging the valve spool to move upwardly from the position indicated by the right half thereof. For this reason, the pressure directed from the oil conduit 40 to the chamber 13d is prevented from extending beyond the chamber with the result that the pressure fed from the oil conduit 40 to the front clutch pressure reducing valve 15 is passed unmodulated through the oil conduit 70 and the shuttle valve 61 and is fed through the oil conduit 62 to the front clutch 104. As the pressure in the oil conduit 40 rises thereafter and causes the valve spool 15b to move upwardly into the position indicated by the left half thereof, the front clutch 104 is supplied with an oil pressure which is produced by reducing and modifying the line pressure in accordance with the throttle pressure in the oil conduit 72 by the previously described pressure modifying function of the front clutch reducing valve 15 and which is thus substantially proportional to the output energy of the engine. At a time when the oil pressure in the oil conduit 40 is increased to a value capable of overcoming the force of the spring 13c, the oil pressure causes the valve spool 13b to move upwardly from the position indicated by the right half to the position indicated by the left half of the valve spool so that the chamber 13d is permitted to communicate with the oil conduit 65 and as a consequence the pressure which has been directed to the chamber 13d by way of the oil conduit 40 is passed to the oil conduit 65. The pressure is thereafter passed through the oil conduit 65 and further through the oil conduit 80 provided with the check valve 68 and is fed by way of the oil conduit 67 to the servo release chamber 106'b. When the line pressure is thus supplied to the servo release chamber 106'b, the piston of the band servo motor 106' moves back toward the servo apply chamber 106'a, since the pressure acting area of the servo apply chamber 106'a is smaller than that of the servo release chamber 106'b. After the pressure supplied to the front clutch 104 is increased beyond a certain value by virtue of the above described function and the front clutch is enabled to commence the coupling action thereof, the supply of the pressure to the servo release chamber 106'b is effected (viz., the second brake 106 is released by the servo motor 106') so that the coupling motion of the front clutch 104 is slightly overlapped in time with the release of the second brake 106. Thus, the engine is prevented from racing that would otherwise occur if the front clutch and the second brake are allowed to be inoperative concurrently. A shift is made from the second gear ratio to the third gear ratio in the automatic transmission in the above-mentioned manner.

As the vehicle speed rises a certain value while the vehicle is moving with the third gear ratio, the governor pressure directed from the governor pressure circuit 23 to the chamber 5d of the 3-2 downshift valve 5 causes the spool 5b of the valve 5 to move upwardly from the position indicated by the left half thereof against the force of the spring 5c. If the accelerator pedal is depressed and as a consequence the throttle valve opening degree is increased under such condition, the modulated throttle pressure indicative of the valve opening degree and directed from the gear shift control pressure circuit 25 to the 3-2 downshift valve 5 by way of the oil conduit 39 acts on the differential area between the land 5e and land 5g and, in cooperation with the spring 5c, causes the valve spool 5b to move downwardly into the position indicated by the right half of the spool 5b. Communication is now provided between the oil conduit 36 and oil conduit 39 so that the modulated throttle pressure is fed through the oil conduits 39 and 36 and the shuttle valve 34 to the chamber 4o of the 2-3 shift valve 4 and causes the valve spool 4c to move downwardly from the upshift position indicated by the left half to the downshift position indicated by the right half thereof against the force resulting from the governor pressure developed in the chamber 4e. This causes the oil conduit 32 to be isolated from the oil conduit 41 so that the supply of the line pressure to the oil conduit 32 is interrupted and at the same time the oil conduit 32 is permitted to communicate with the drain port 4r, whereby the oil pressure which has been fed to the front clutch 104 and the servo release chamber 106'b under the third gear ratio condition is now discharged in the manner to be described in the following. As the oil pressure in the chamber 15d of the front clutch pressure reducing valve 15 is eliminated and as a consequence the valve spool 15b is urged to move by the force of the spring 15c to the position providing communication between the oil conduits 40 and 70 as indicated by the right half of the valve spool, the front clutch pressure is discharged at a comparatively high rate through the oil conduit 62, the shuttle valve 61, the oil conduits 70, 40 and 32 and the drain port 4r. Since, on the other hand, there is no oil pressure developed in the chamber 13d of the 2-3 timing valve 13, the valve spool 13b is urged to move by the force of the spring 13c into the position allowing the oil conduit 65 to open to the drain port 13e as indicated by the right half of the valve spool, the servo release pressure is discharged at a comparatively low rate through the oil conduit 67, the oil conduit 80, the orifice 69, the oil conduit 65 and the drain port 13e. When the vehicle speed decreases by a certain degree under this condition, the governor pressure indicative of this vehicle speed and directed from the governor pressure circuit 23 to the chamber 14d of the 3-2 timing valve 14 through the oil conduit 66 can not hold the valve spool 14b upwardly to the position indicated by the left half thereof against the force of the spring 14c, so that the valve spool 14b is allowed to move downwardly into the position indicated by the right half of the spool, thereby providing communication between the oil conduits 65 and 67. In this instance, the servo release pressure is discharged through the oil conduit 67, the 3-2 timing valve 14, the oil conduit 65 and the drain port 13e at a rate which is comparatively higher than the rate achieved when the vehicle speed is relatively high as previously described. In this manner, the servo release pressure is discharged, when compared with the discharge rate of the front clutch pressure, at a relatively low rate determined by the flow rate of oil through the orifice 69 under high vehicle speed conditions and at a relatively high rate when the vehicle speed is relatively low. For these reasons, the actuation of the servo motor 106' to apply the second brake 106 is retarded at high vehicle speeds as compared with the timing at which the front clutch 104 is uncoupled, thereby making it possible to achieve a prolonged neutral interval during which the engine is enabled to increase its revolution speed to a value to match the vehicle speed while a downshift is being made from the third gear ratio to the second gear ratio without producing a gear shift shock. At low vehicle speeds, the amount of retardation in the application of the second brake 106 as compared with the timing at which the front clutch 104 is to be uncoupled is reduced so that the amount of retardation provides the period of time which is required for the engine to increase its speed to a level to match the vehicle speed, thereby making it possible to reduce the gear shift shock produced during the above described downshift.

It may be mentioned that, when the vehicle speed and accordingly the governor pressure developed in the chamber 5d decreases, the 3-2 downshift valve 5 performs a function similar to that which the valve 5 does in response to an increase in the throttle valve opening degree as above described, enabling the automatic transmission mechanism to make a downshift from the third gear ratio to the second gear ratio.

As the vehicle speed further decreases, the governor pressure in the chamber 3e of the 1-2 shift valve 3 becomes no longer capable of overcoming the force of the spring 3d so that the spring causes the valve spools 3b and 3c to move downwardly from the positions indicated by the left halves to the positions indicated by the right halves in the drawing, thereby isolating the oil conduits 31 from the oil conduit 30 and permitting the oil conduit 31 to communicate with the drain port 3t. As a consequence, the line pressure which has been fed to the servo apply chamber 106'a is passed through the check valve 76 in the oil conduit 42 and is discharged through the oil conduit 31 and the drain port 3t, thereby causing the band servo motor 106' to release the second brake 106. Among the friction units, only the rear clutch 105 is now held in the operative state so that a downshift is effected from the second gear ratio to the first gear ratio in the automatic transmission.

When the spool 2f of the manual valve 2 is thereafter urged to move back to N range position, the port 2b is drained off so that the line pressure which has been passed to the rear clutch 105 is discharged through the oil conduit 29, the check valve 77 and the oil conduit 22 and further by way of the port 2b of the manual valve 2 and renders all the friction units of the automatic transmission inoperative, producing a neutral condition in which the transmission of power is interrupted.

When the accelerator pedal is fully depressed to produce a kickdown condition while the vehicle is moving with the above described third gear ratio, the plunger 8d of the throttle valve 8 moves into the rightward limit position thereof as previously described so that a kickdown pressure (line pressure) is developed in the kickdown pressure circuit 24. The kickdown pressure thus developed is directed on one hand to the port 3u of the 1-2 shift valve 3 and on the other hand to the chamber 4p of the 2-3 shift valve 4 through the oil conduit 37. The kickdown pressure directed into the chamber 4p acts on the upper and lower pressure acting faces of the land 4g and the upper pressure acting face of the land 4h of the valve spool 4b held in the position indicated by the left half of the spool and, in cooperation with the spring 4d, causes the valve spools 4b and 4c to move downwardly into the positions indicated by the right halves thereof. As a consequence, the 2-3 shift valve 4 effects a downshift from the third gear ratio to the second gear ratio in the automatic transmission in a manner similar to that which has been described. If the vehicle speed further decreases, the kickdown pressure which is fed from the circuit 24 to the port 3u of the 1-2 shift valve 3 acts on the upper pressure acting face of the land 3h, the upper and lower pressure acting faces of the land 3g and the lower pressure acting face of the land 3f and, in cooperation with the spring 3d, causes the valve spools 3b and 3c to move downwardly from the positions indicated by the left halves to the positions indicated by the right halves of the spools. As a consequence, the 1-2 shift valve 3 effects a downshift from the second gear ratio to the first gear ratio in a manner similar to that which has been described.

When a kickdown condition is produced while the vehicle is moving with the first gear ratio, the line pressure appearing in the gear shift control pressure circuit 25 as above described acts on the differential area between the lands 3m and 3n of the valve spool 3c held in the position indicated by the right half of the spool in the 1-2 shift valve 3 and further on the differential area between the lands 4h and 4i of the valve spool 4b held in the position indicated by the right half of the spool in the 2-3 shift valve 4, thereby urging each of these valve spools to move downwardly in the drawing. Furthermore, the kickdown pressure developed in the kickdown pressure circuit 24 acts on the differential area between the lands 3g and 3h of the valve spool 3b in the position indicated by the right half of the spool in the 1-2 shift valve 3 and further on the land 4g of the valve spool 4b in the position indicated by the right half of the spool in the 2-3 shift valve 4, thereby urging these valve spools downwardly. Furthermore, the shift valves 3 and 4 are subjected to the downward forces which are exerted by the springs 3d and 4d, respectively. The above described downward forces thus exerted on the spools of the shift valves 3 and 4 are opposed by the forces resulting from the governor pressure developed in the chambers 3e and 4e so that, when the vehicle speed becomes such that the governor pressure resulting therefrom overcomes the downward forces exerted on the valve spool of the 1-2 shift valve, then the 1-2 shift valve 3 effects an upshift from the first gear ratio to the second gear ratio in the manner previously described and, when the vehicle speed becomes such that the governor pressure resulting therefrom overcomes the downward force exerted on the valve spool of the 2-3 shift valve 4, then the 2-3 shift valve 4 effects an upshift from the second gear ratio to the third gear ratio in the manner previously described. Since, however, the downward forces exerted on the valve spools of shift valves 3 and 4 are larger than the downward forces which are exerted thereon under ordinary throttle valve opening degree conditions, an upshift can not be effected and accordingly acceleration can be achieved by a large driving power with a low gear ratio until the vehicle speed is increased beyond levels which are higher than the corresponding levels at which an upshift takes place in the ordinary throttle valve opening degrees.

The operation to be achieved upon setting the manual valve 2 from D range to II range when the vehicle is moving with the third gear ratio in D range is explained now. Under the condition wherein the third gear ratio in the D range is in play, the line pressure (third gear ratio pressure) directed to the oil conduit 40 is passed through the groove 6e of the line pressure booster valve 6 and the oil passage 6g to the chamber 6f and causes the valve spool 6b to move from the position indicated by the upper half to the position indicated by the lower half thereof against the force of the spring 6c, whereupon the valve spool 6b is held in the latter position by the line pressure (second gear ratio pressure) which is directed from the oil conduit 31 to the chamber 6f by way of the groove 6e and the oil passage 6g. When the manual valve 2 is set to II range under this condition, the line pressure circuit 16 is permitted to communicate with the outlet ports 2b and 2c so that the line pressure is directed from the outlet port 2b to the same places as those previously described and the line pressure is directed from the outlet port 2c of the manual valve, as a II range pressure, to the chamber 4o of the 2-3 shift valve 4 by way of the oil conduit 35, shuttle valve 34 and oil conduit 33 for acting on the upper end surface of the land 4m and thereby causing the valve spool 4c to move downwardly from the upshift position indicated by the left half to the downshift position indicated by the right half of the spool in the drawing. The II range pressure from the outlet port 2c of the manual valve 2 is directed also to the oil conduit 45. The 2-3 shift valve 4 is therefore shifted into the downshift state wherein the drain port 4r plays a role in discharging the oil pressure which has been directed to the front clutch 104 and the servo release chamber 106'b to effect a downshift from the third gear ratio to the second gear ratio in the automatic transmission mechanism. Since, in this instance, the II range pressure fed to the chamber 4o holds the valve spool 4c in the downshift position thereof, an upshift to the third gear ratio is prevented even if there is an increase in the vehicle speed. The line pressure directed to the oil conduit 45 is passed through the oil conduit 43 and the shuttle valve 46 to the port 7h of the pressure modifier valve 7 with the line pressure booster valve 6 held in the above described state. The throttle modifier valve 7 is thus operative to deliver to the oil conduit 54 the modified throttle pressure with the maximum magnitude irrespective of the variation in the throttle valve opening degree by reason of the previously described pressure modifying function of the valve, the modified throttle pressure being fed to the pressure regulator valve 1. As a consequence, the pressure regulator valve 1 is enabled, by reason of the previously described operational function thereof, to boost the magnitude of the line pressure in the line pressure circuit 16 up to its maximum value irrespective of the variation in the throttle valve opening degree. For this reason, a sufficiently high line pressure is produced and accordingly the rear clutch 105 and the band servo motor 106' for the second brake 106 are actuated powerfully from low to medium throttle valve opening degrees, thereby ensuring sufficient engine braking effect under the II range condition.

When the vehicle speed decreases to a certain value while the vehicle is running under the II range condition, the valve spool 3b of the 1-2 shift valve 3 moves downwardly from the upshift position indicated by the left half to the downshift position indicated by the right half of the spool under the influence of the spring 3d with the result that a downshift is effected from the second gear ratio to the first gear ratio in the automatic transmission in a manner similar to that previously described. Under this condition, the oil pressure which has been developed in the oil conduit 31 is eliminated and, as a consequence, the valve spool 6b of the line pressure booster valve 6 is liberated from a force holding the valve spool 6b in the righthand position indicated by the lower half of the spool and is therefore urged to move back into the position indicated by the upper half of the spool by the force of the spring 6c. As a result, the line pressure in the oil conduit 45 is prevented from extending beyond the line pressure booster valve 6, and the oil conduit 43 is permitted to communicate through the oil conduits 44 and 47 with the drain port 9c of the throttle failsafe valve 9. To the port 7h of the pressure modifier valve 7 is thus supplied the throttle pressure from the throttle pressure circuit 48 via the shuttle valve 46, thereby enabling the pressure modifier valve 7 to control the pressure regulator valve 1 so that the pressure regulator valve 1 develops unboosted line pressure in the line pressure circuit 16.

As the vehicle speed increases thereafter and as a consequence the governor pressure developed in the chamber 3e of the 1-2 shift valve 3 urges the shift valve 3 into the upshift state thereof, an upshift is made from the first gear ratio to the second gear ratio in the manner previously described. Although the line pressure developed in the oil conduit 31 is directed to the line pressure booster valve 6 under this condition, since the valve spool 6b of the valve 6 is held in the position indicated by the upper half of the spool, it does not move rightwardly. Accordingly, the line pressure is boosted up to its maximum magnitude in response to downshift to the second gear ratio from the third gear ratio as a result of setting the manual valve 2 from D range to II range or I range. This provides a sufficiently high force to the servo motor 106' for the second brake 106 to apply the second brake 106 with a force sufficiently high enough to ensure an engine braking effect. Once the first gear ratio is achieved, however, the line pressure shall not be boosted, and accordingly the gear shift shock is not amplified even if an upshift from the first gear ratio to the second gear ratio and a downshift from the second gear ratio to the first gear ratio are repeated alternately. Where a shift is made from the second gear ratio in D range to the second gear ratio in II range or that in I range, the second brake 106 is kept applied to grasp the drum 126 (see FIG. 1) to provide the brake necessary for engine braking upon setting the manual valve 2 to II range from D range under third gear ratio condition. Therefore, the line pressure need not be augmented by the line pressure booster valve 6.

When the manual valve 2 is set to I range, the line pressure circuit 16 is permitted to communicate not only with the ports 2b and 2c, but also with the port 2d. The line pressure passed through the ports 2b and 2c is directed to the same places as those previously described and the line pressure passed through the port 2d is supplied to the manual first range pressure reducing valve 11 as a I range pressure. There being initially no oil pressure in the chamber 11d of the pressure reducing valve 11, the valve spool 11b is maintained in the lower position indicated by the right half of the spool 11b by the force of the spring 11c. When, however, the line pressure directed from the oil conduit 59 is passed to the chamber 11d and causes the valve spool 11b to move upwardly so that the line pressure is partially discharged through the drain port 11f, the valve spool 11b assumes a balanced position indicated by the left half of the spool, thereby reducing the line pressure to a magnitude equal to the force of the spring 11c acting on the valve spool 11b in the balanced position. The line pressure directed to the oil conduit 59 is therefore reduced to a constant value, and the reduced pressure thus obtained is passed through the oil conduit 58, the shuttle valve 28 and the oil conduit 26 and acts on the land 31 of the spool of the 1-2 shift valve 3, exerting a downward force on the valve spool 3c. At vehicle speeds at which the downward force is smaller than the upward force resulting from the governor pressure developed in the chamber 3e, the valve spools 3b and 3c are held in the upshift positions indicated by the respective left halves of the spools and keep the automatic transmission in the second gear ratio, thereby preventing the engine from overrunning which would otherwise be caused if a downshift to the first gear ratio is made right after the manual valve 2 has been set to I range while the vehicle is moving at a high speed. In this case, the line pressure is augmented by the line pressure booster valve 6 to ensure effective engine braking in the same manner as previously described in connection with the operation under II range condition when the second gear ratio is established as a result of selecting I range when the vehicle is moving with the third gear ratio. The line pressure in this case is directed from the port 2c as I range pressure through the oil conduit 45 to the line pressure booster valve 6. As the vehicle speed decreases and as a consequence the upward force resulting from the governor pressure developed in the chamber 3e decreases, the valve spool 3c moves downwardly into the position indicated by the right half of the spool in the drawing by the downward force resulting from the previously mentioned constant reduced pressure acting on the land 31 of the valve spool 3c, while the valve spool 3b is held in the position indicated by the left half thereof and spaced apart from the valve spool 3c by the above mentioned constant reduced oil pressure with the spring 3d in a compressed state. Under this condition, the oil conduit 27 which has been open to the drain port 3s is permitted to communicate with the oil conduit 26 and allows the contant reduced oil pressure in the oil conduit 26 to be directed through the oil conduit 27 to the low-and-reverse brake 107, so that the automatic transmission is enabled to drive the vehicle under I range condition while producing an engine braking effect by means of the low-and-reverse brake 107 thus applied and the rear clutch 105 which is maintained coupled. The manual first range pressure reducing valve 11 is adapted to reduce the line pressure from the oil conduit 59 to a constant value dictated by the force of the spring 11c and delivers the reduced oil pressure to the oil conduit 58 so that the shift point for the 1-2 shift valve 3 can be selected to occur at a desired constant vehicle speed under manual first range (I range) condition for thereby preventing, without any delay, the engine from overrunning over the whole throttle valve opening degree range.

When the manual valve 2 is set from N range to R range, the line pressure circuit 16 is permitted to communicate with the outlet ports 2a and 2e. From the outlet port 2a, the line pressure is passed through the oil conduit 60 as a reverse pressure and is directed on one hand through the shuttle valve 28 and the oil conduit 26 to the 1-2 shift valve 3 and further through the oil conduit 27 to the low-and-reverse brake 107 with the valve spools 3b and 3c held in the positions indicated by the right halves thereof in the absence, in the chamber 3e, of governor pressure, and on the other hand through the orifice 78, shuttle valve 61 and oil conduit 62 to the front clutch 104. The line pressure to be passed to the front clutch 104 is restricted by the orifice 78 on its way to the front clutch 104 so that the oil pressure to be developed in the front clutch 104 increases initially at a low rate and thereafter at a gradually increasing rate. The oil pressure to be supplied to the front clutch 104 is also directed through a branch conduit from the oil conduit 60 to the chamber 12a of the accumulator 12 and causes the stepped piston 12b to move downwardly against the force of the spring 12f. As a consequence, the oil conduit supplied to the front clutch 104 increases slowly and accordingly the front clutch 104 is caused to couple slowly without producing shock which would otherwise be caused when the manual valve 2 is set from N range to R range. The automatic transmission is thus made operative to drive the vehicle rearwardly with the front clutch 104 coupled and the low-and-reverse brake 107 applied.

When the manual valve 2 is set to N range, the outlet port 2a is permitted to communicate with the drain opening so that the line pressure in the front clutch 104 is discharged quickly through the oil conduit 62, the shuttle valve 61, the oil conduit 60, the check valve 79 and the port 2a of the manual valve 2 while the line pressure in the low-and-reverse brake 107 is discharged quickly by way of the oil conduit 27, the shuttle valve 28, the oil conduit 60 and the port 2a of the manual valve 2, thereby rendering the automatic transmission into the neutral condition thereof.

The following description concentrates on how the hydraulic control system according to the present invention prevents the occurrence of an interlock in the change-speed gearbox (see FIG. 1) of the automatic transmission.

Consider a case where the valve spools 4b and 4c of the 2-3 shift valve 4 are stuck in the upshift state when the valve spools 3b and 3c of the 1-2 shift valve 3 are in the downshift state. If, in this case, the manual valve 2 is set to D range, the outlet port 2d of the manual valve 2 is drained off, and thus no I range pressure appears from the port 2d, with the result that the low-and-reverse brake 107 is prevented from being applied although the front clutch 104 is coupled and second brake 106 is released owing to the upshift state of the 2-3 shift valve 4. Therefore, what happens in this case is the engagement of the rear clutch 105 and that of the front clutch 104 to establish the third gear ratio.

If, in the above-mentioned case, the manual valve 2 is set to II range, since the outlet port 2d is drained off and thus no I range pressure appears from the outlet port 2d, the low-and-reverse brake 107 is prevented from being applied. In this case, since the outlet port 2e is drained off, too, the engagement of the front clutch 104 and the release of the second brake 106 are prevented from taking place. Since the port 2e and port 2d are drained off when the manual valve 2 is in II range, what is allowed to occur as a result of any one of possible combinations of upshift state or downshift state of 1-2 shift valve 3 with that of the 2-3 shift valve 4 is the engagement of the rear clutch 105 and/or the application of the second brake 106. Therefore, the interlock will not take place when the manual valve 2 is set to II range.

If, in the before-mentioned case, the manual valve 2 is set to I range, the second gear ratio is established in order to prevent overun of the engine or once the vehicle speed has dropped sufficiently, the first gear ratio is established and held by actuating the rear clutch 105 and the low and reverse brake 107, wherein the change over between these two gear ratio states is carried out by the 1-2 shift valve 3 so that there is no possibility that both the second brake 106 and the low and reverse brake are actuated at the same time, even if the valve spools 3b and 3c of the 1-2 shift valve 3 are stuck in the upshift or downshift state. Therefore the transmission is prevented from being interlocked by simultaneous engagement of the three friction elements, viz., the rear clutch 105, second brake 106 and low-and-reverse brake 107. Furthermore, in this I range state, since the outlet port 2e of the manual valve 2 is drained off so that there is no supply of II range pressure to the 2-3 shift valve 4, there occurs no possibility that the front clutch 104 is engaged even if the 2-3 shift valve 4 is stuck in the upshift or downshift state.

If the manual valve 2 is set to R range, since the outlet port 2b is drained off, the rear clutch 105 will not be engaged and since no line pressure is directed to the 1-2 shift valve 3 from the outlet port 2b, the second brake 106 will not be engaged. Therefore, the transmission is prevented from being interlocked because in the R range no friction element except the front clutch 104 and low and reverse brake 107 is engaged.

What is claimed is:

1. A hydraulic control system for an automatic transmission having a first friction unit to be engaged for all of forward drive ranges, a second friction unit and a third friction unit, the hydraulic control system comprising:

pressure regulator valve means for producing a line pressure;

manual valve means coupled with said pressure regulator valve means to receive the line pressure, said manual valve means having a valve body formed with a bore and a spool slidably disposed within said bore for movement to an automatic forward drive range, at least one manual forward drive range and a reverse drive range, said manual valve means being formed with a first outlet port which is allowed to receive the line pressure when said spool is set in one of said automatic forward drive range and said at least one manual forward drive range to provide a forward drive range pressure, a second outlet port which is allowed to receive the line pressure when said spool is set in any one of said automatic forward drive range and said reverse drive range to produce an automatic forward drive and reverse drive range pressure, and a third outlet port which is allowed to receive the line pressure when the spool is set in said at least one manual forward drive range to produce a manual range pressure, said first outlet port of said manual valve means communicating with the first friction unit to supply said forward drive range pressure;

first shift valve means for effecting a shift between a gear ratio and another gear ratio, said first shift valve means having an inlet port communicating with said first outlet port of said manual valve means to receive said forward drive range pressure, an outlet port communicating with the second friction unit and a drain port, said first shift valve means being shiftable between a downshift state wherein said outlet port thereof is isolated from said inlet port thereof and is allowed to communicate with said drain port thereof and an upshift state wherein said outlet port thereof is allowed to communicate with said inlet port thereof and is isolated from said drain port thereof;

means defining a conduit having one end connected to said second outlet port of said manual valve means; and second shift valve means for effecting a shift between said another gear ratio and still another gear ratio, said second shift valve means having an inlet port connected to the other end of said conduit, an outlet port communicating with the third friction unit and a drain port, said second shift valve means being shiftable between a downshift state wherein said outlet port thereof is isolated from said inlet port thereof and is allowed to communicate with said drain port thereof and an upshift state wherein said outlet port thereof is allowed to communicate with said inlet port thereof and is isolated from said drain port thereof, said second shift valve means having a second inlet port communicating with said third outlet port of said manual valve means to receive said manual range pressure and being urged in response to said manual range pressure to shift into said downshift state thereof.

2. A hydraulic control system as claimed in claim 1, further comprising line pressure boost means coupled with said third outlet port of said manual valve means and said pressure regulator valve means for boosting the magnitude of said line pressure in response at least to said manual range pressure from said third outlet port of said manual valve means.

3. A hydraulic control system as claimed in claim 1 or 2, wherein said conduit is provided with orifice means for restricting flow of fluid passing through said conduit.

4. A hydraulic control system as claimed in claim 1 or 2, wherein said first outlet port of said manual valve is isolated from said pressure regulator valve means and is drained off when said spool is set in said reverse drive range, said second outlet port of said manual valve is isolated from said pressure regulator valve means and is drained off when said spool is set in said at least one manual drive range, and said third outlet port of said manual valve means is isolated from said pressure regulator valve means and is drained off when said spool is set in one of said automatic forward drive range and reverse drive range.

5. A hydraulic control system as claimed in claim 2, including a servo motor for the second friction unit having a servo apply chamber communicating with said outlet port of said first shift valve means and a servo release chamber, and wherein said outlet port of said second shift valve means communicates with said servo release chamber.

* * * * *